Sept. 15, 1953 T. N. KELLY 2,652,131
RETRACTABLE SCREEN FOR THE AIR INTAKE OF JET
ENGINES AND SHIELDS OR SHUTTERS FOR THE SAME
Filed July 22, 1950 6 Sheets-Sheet 1
FIG.1.
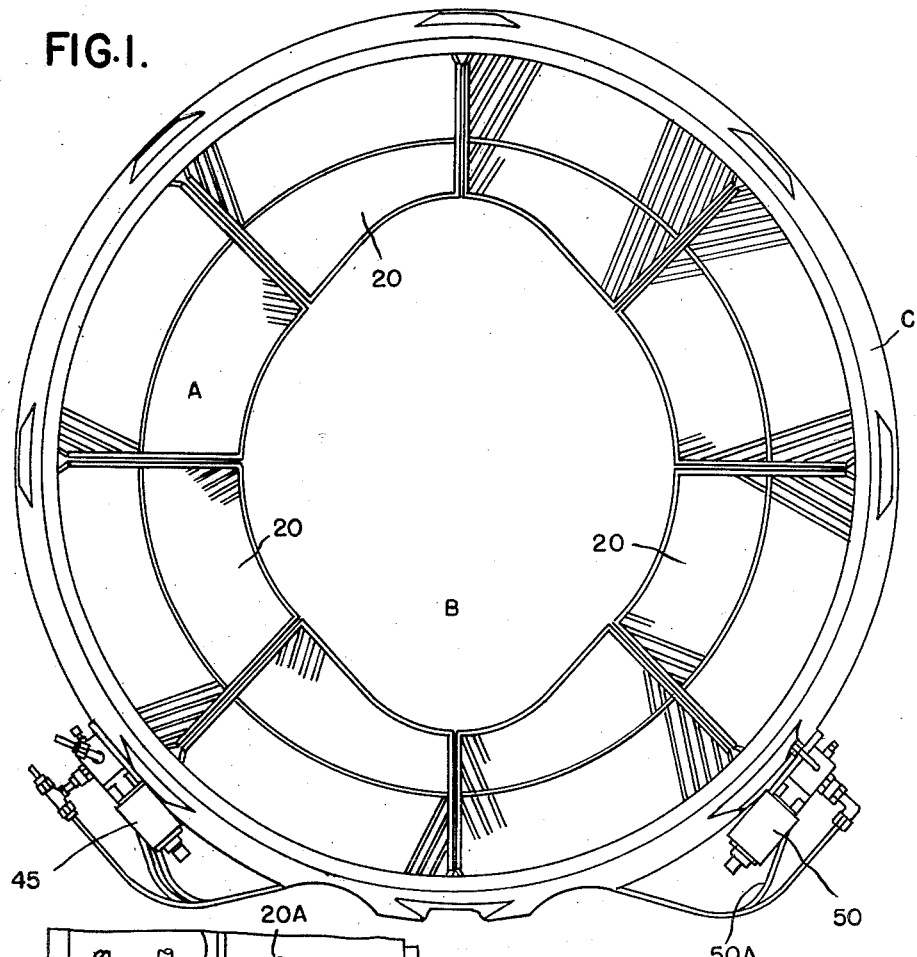
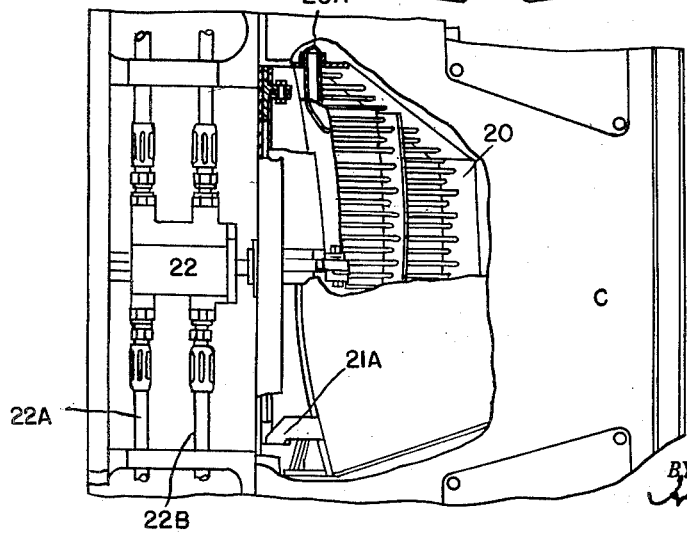
FIG.2.
INVENTOR.
THOMAS N. KELLY
ATTORNEYS

INVENTOR.
THOMAS N. KELLY

ATTORNEYS

Sept. 15, 1953 T. N. KELLY 2,652,131
RETRACTABLE SCREEN FOR THE AIR INTAKE OF JET
ENGINES AND SHIELDS OR SHUTTERS FOR THE SAME
Filed July 22, 1950 6 Sheets-Sheet 3
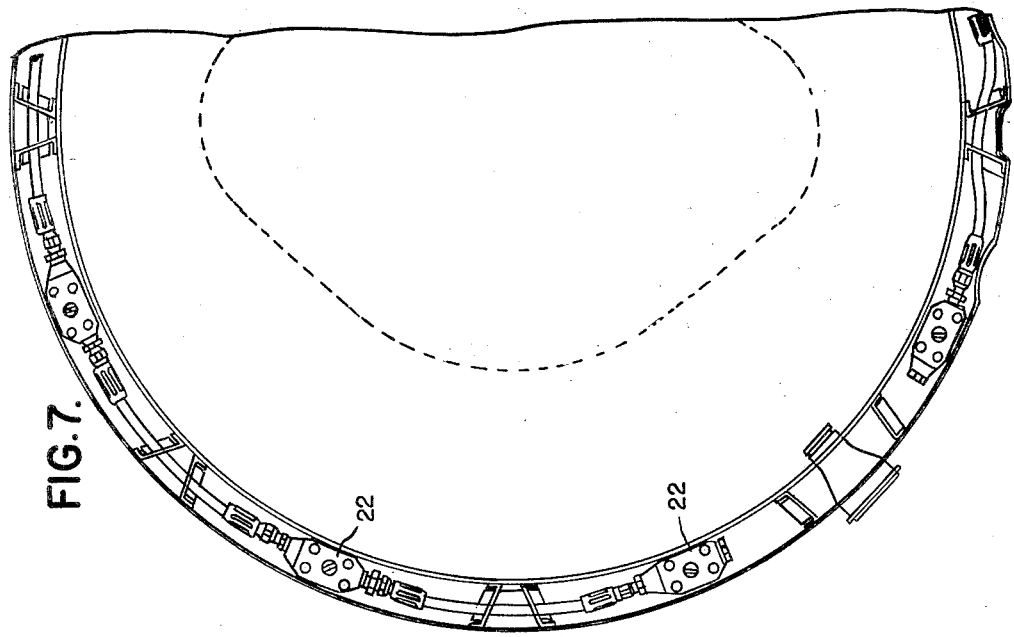
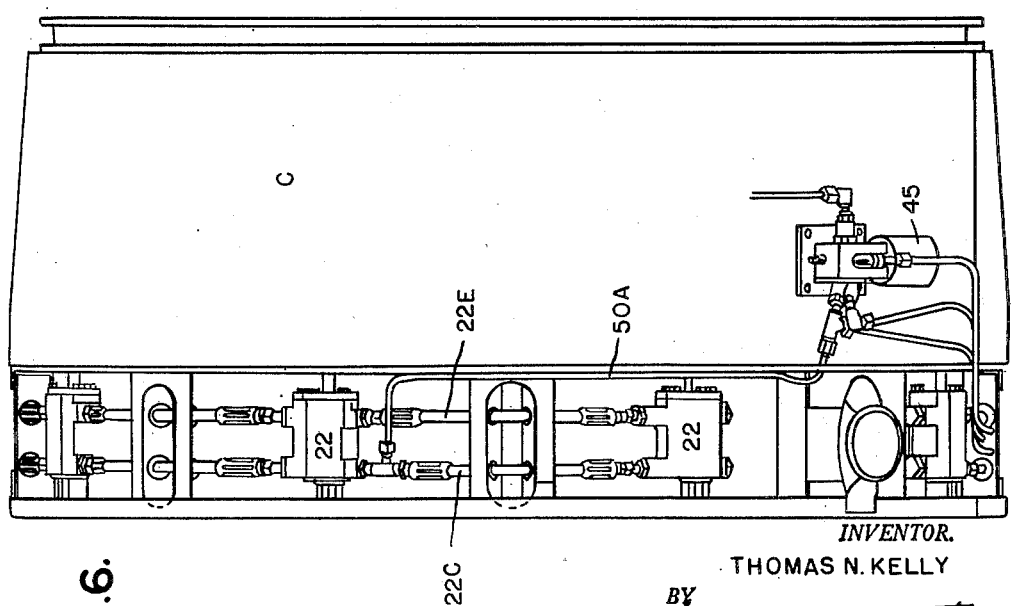
INVENTOR.
THOMAS N. KELLY
BY
ATTORNEYS Sept. 15, 1953 T. N. KELLY 2,652,131
RETRACTABLE SCREEN FOR THE AIR INTAKE OF JET
ENGINES AND SHIELDS OR SHUTTERS FOR THE SAME
Filed July 22, 1950 6 Sheets-Sheet 5
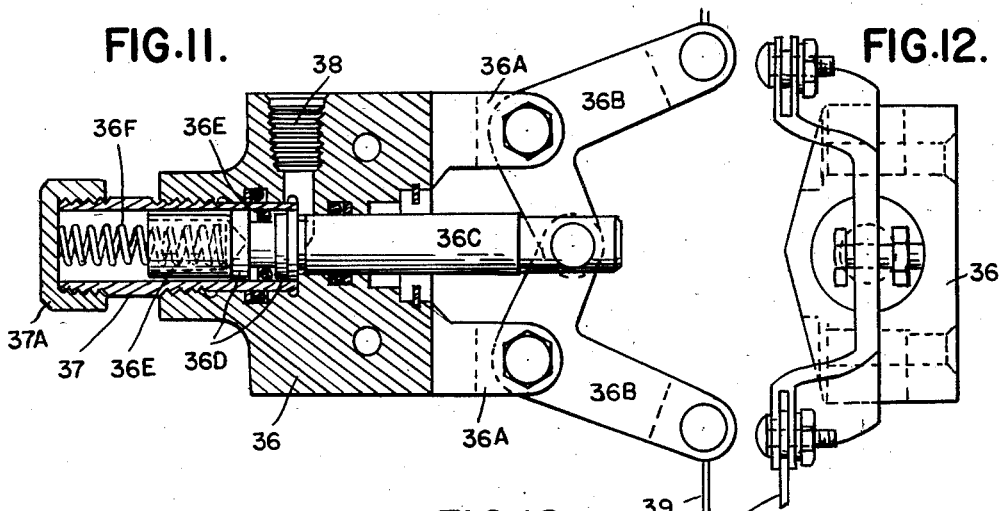
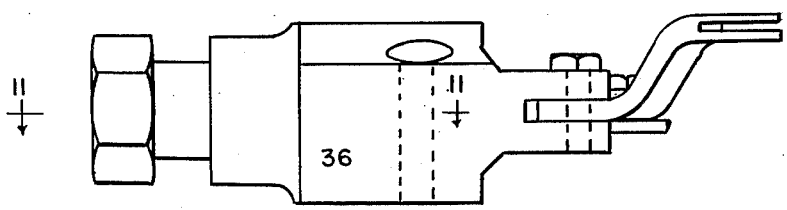
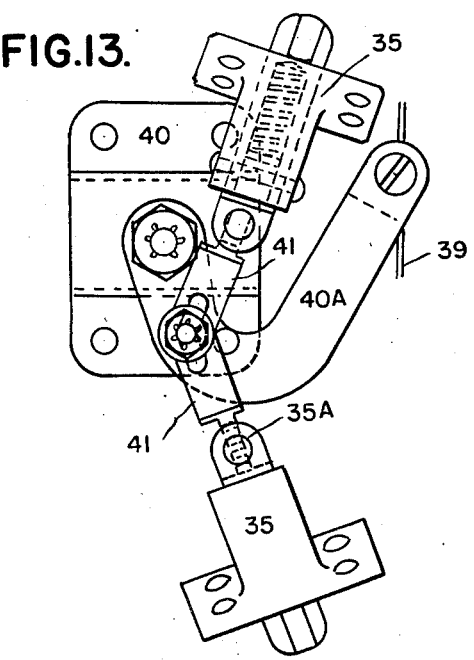
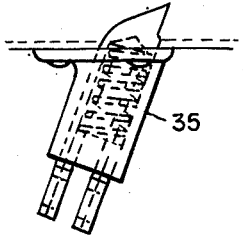
*INVENTOR.*
THOMAS N. KELLY
BY
ATTORNEYS

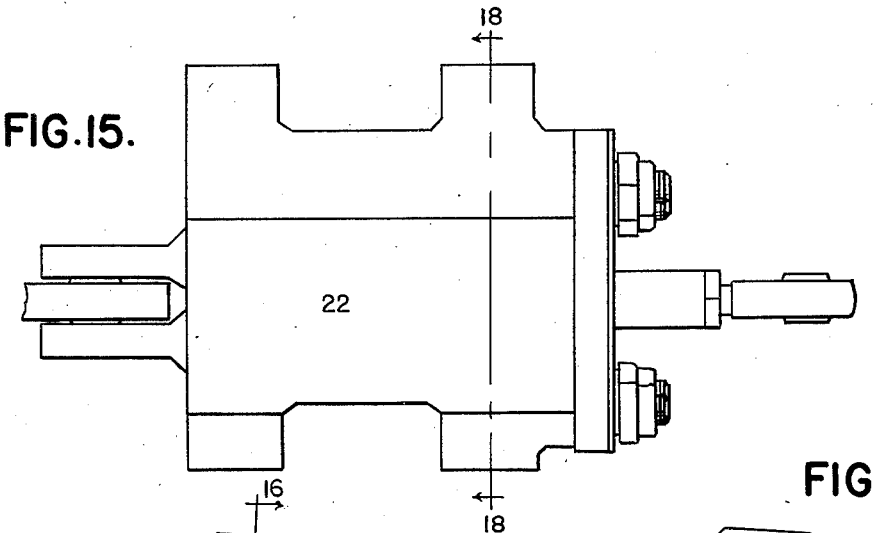
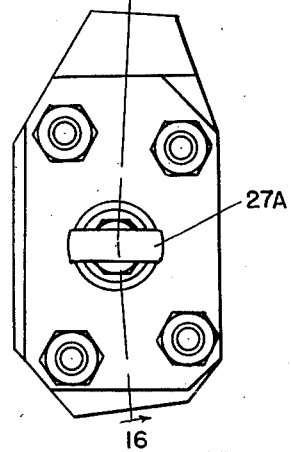
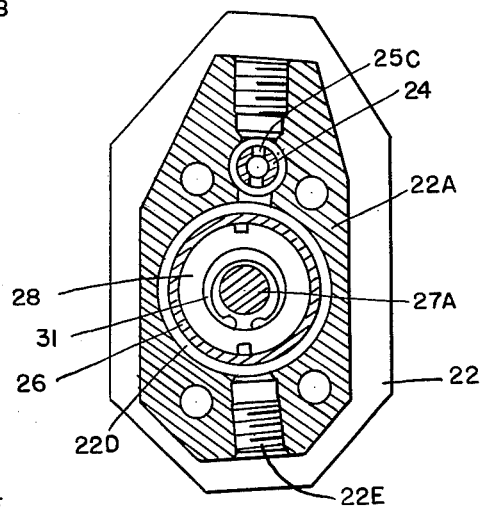
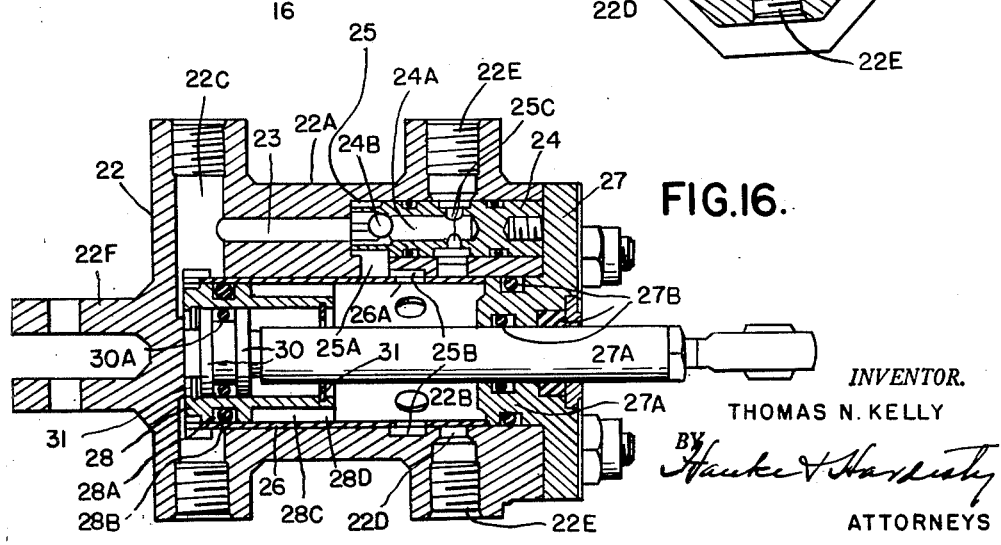

Patented Sept. 15, 1953

2,652,131

UNITED STATES PATENT OFFICE 2,652,131

RETRACTABLE SCREEN FOR THE AIR INTAKE OF JET ENGINES AND SHIELDS OR SHUTTERS FOR THE SAME

Thomas N. Kelly, Ferndale, Mich., assignor to George W. Smith, doing business as Smith-Morris Company, Ferndale, Mich.

Application July 22, 1950, Serial No. 175,444

4 Claims. (Cl. 183—62)

1

The present invention relates to retractible screens for the air intake for jet engines and to shields or shutters for the same.

In the operation of jet engines on air planes, it is desirable while the plane is still on or near the ground, to screen the air intake to prevent drawing in solid objects which might damage the air conduits or other parts. It is also desirable to be able to remove the screens after take off.

Further, it is desirable, particularly with multiple engine planes, to be able to completely shut down an engine and to cut off completely the air intake for more or less obvious reasons.

It is among the objects of the present invention to provide means for obtaining the above mentioned results: namely, to extend and retract the screens whenever desirable, and also to extend and retract means for shutting or the air flow when desired.

Other objects and advantages will be apparent to those skilled in the art upon reference to the following description and the accompanying drawings in which Fig. 1 is a front elevation of a screen and shutter assembly.

Fig. 2 is a plan view of one of the elements thereof with a part of the shutter broken away.

Fig. 6 is a side elevation showing the hydraulic operating mechanism.

Fig. 7 is a part sectional view showing a partial side view of the mechanism of Fig. 6.

Fig. 10 is a side elevation of the latch operator.

Fig. 11 is a section on line 11—11 of Fig. 10.

Fig. 12 is a view in elevation as from the right of Fig. 11.

Fig. 13 is a plan view of a latch mechanism.

Fig. 14 is a view in elevation of one of the latches.

Fig. 15 is a view in elevation of one of the screen operating units.

Fig. 16 is a sectional view on line 16—16 of Fig. 17.

Fig. 17 is a view in elevation as from the right of Fig. 15.

Fig. 18 is a section on line 18—18 of Fig. 17.

Figure 3:
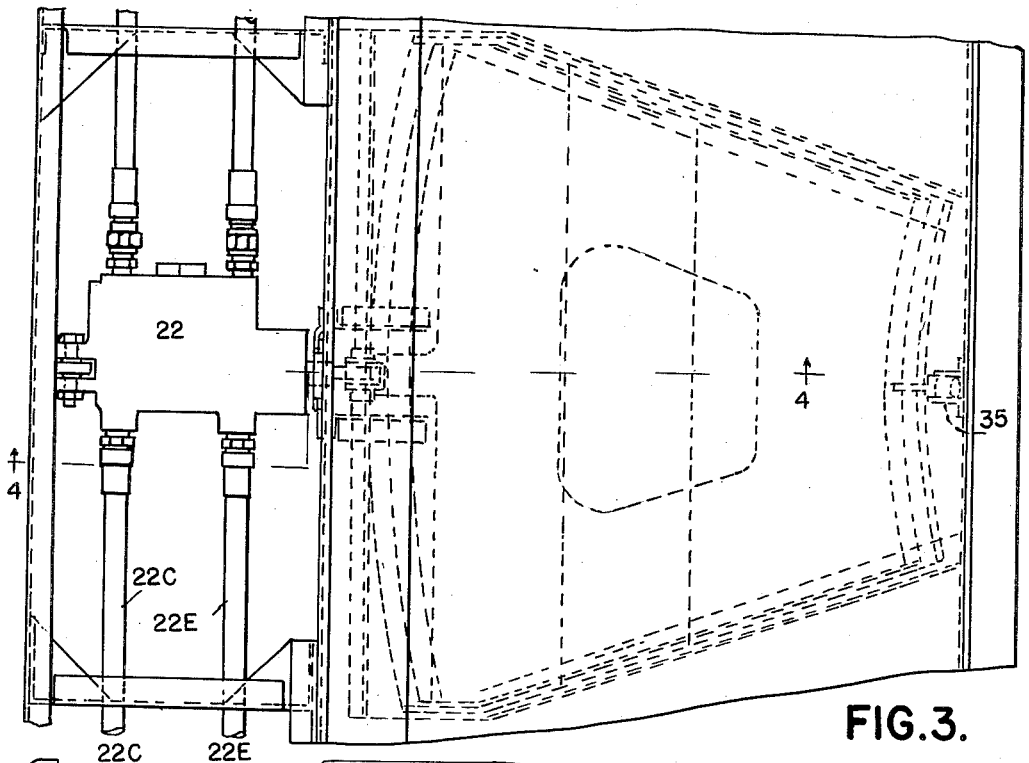
Fig. 3 is a plan view of a single element showing a shutter in open position.
Figure 4:
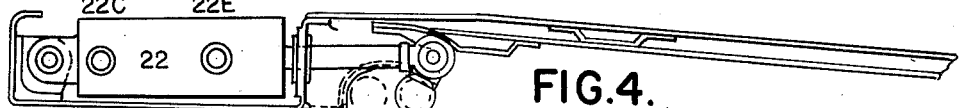
Fig. 4 is a section on line 4—4 of Fig. 3.
Figure 5:
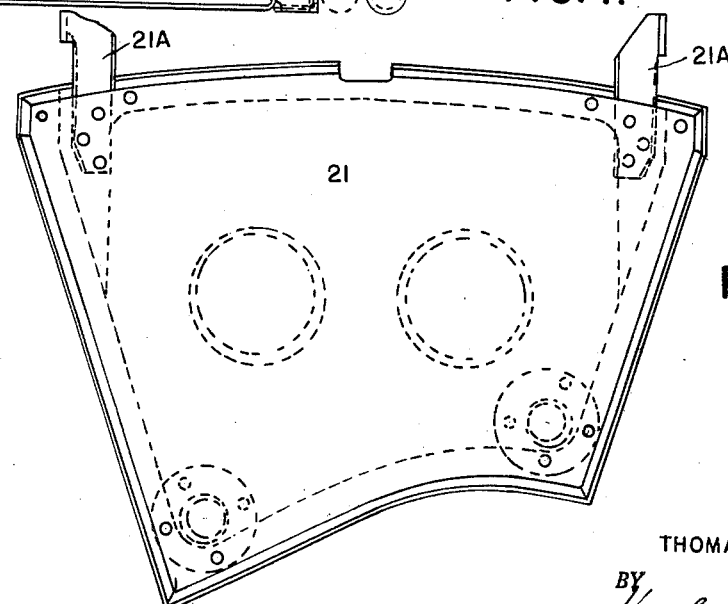
Fig. 5 is a detailed view of the shutter.

As indicated in Fig. 1, the air intake for jet engines for airplanes is usually an annulus A

2 around a centrally located engine (not shown) in the space B, the annulus A being surrounded by suitable cowling C.

In the present installation, there are arranged in the annulus A a plurality of segmental shaped screen elements 20 hinged as at 20A so that they may be moved from the screening position substantially paralleling the outer cowling and hence out of the air flow. Also arranged in the annulus A are a plurality of shutters 21, substantially the shape and area of the screen segments 20 and of equal number. These shutters are also hinged, the hinges 21A being closely adjacent the hinges 20A for the screens, and arranged outside of the screen segments, that is, in advance of the screen as to air flow.

Mounted around the outer perimeter of the screen is a series of screen actuators 22, one for each screen segment. These are small hydraulic piston motors and are arranged in parallel so that they are simultaneously operable. These motors 22 are of the construction indicated in Figs. 15–18 and consist of a body 22A having therein a cylinder 22B open at one end to a through passage or conduit 22C. Near the other end of cylinder 22B is an annular groove 22D open to a second conduit indicated by the threaded connections 22E.

In one wall of the body 22A is a longitudinal passage 23 open to conduit 22C at one end and at its other end enlarged to receive a valve unit 24, which consists of a hollow plug, the bore 24A of which is open to and aligned with passage 23. The open end of the bore 24A is somewhat enlarged and slotted to provide a cage for a ball 24B, which may seat itself in the adjacent end of the bore and act as a valve to close the bore. Further, the ball 24B may also seat in the adjacent end of passage 23 and act as a valve to close this passage.

The slotted end of plug 24 is somewhat reduced in diameter so as to provide a surrounding space 25 communicating through a passage 25A with a second internal peripheral groove 25B in the cylinder wall. Further, the bore 24A is open to the first peripheral groove 22D through small openings 25C.

Within the cylinder 22B is fixed a sleeve 26 which extends from the far end of the cylinder to a point spaced from the outer wall of conduit 22C and is provided with openings 26A through which the interior of the cylinder 22B communicates with the groove 25B. The end of the body 22 adjacent conduit 22C is closed integrally and provided with ears 22F by means of which the motor may be flexibly anchored to a suitable portion of the adjacent structure. The other end of the body is closed by a suitable head 27 having boss 27A extending a short distance into the cylinder and bored axially for the passage of a suitable piston rod 27A, packing therefor being indicated at 27B.

Within the cylinder 22B and sleeve 26 is a piston 28, consisting of a hollow sleeve peripherally grooved as at 28A for the reception of a packing element 28B known as an O-ring and also relieved as at 28C but provided with spacing elements 28D. The piston 28 is carried on the inner end of the rod 27A which itself is formed as a piston slidable within piston 28. This rod piston is shown as consisting of the spaced flanges 30 between which is a suitable packing O-ring 30A, the rod piston being prevented from displacement from piston 28 by the spring rings 31.

In the operation of the motor 22, it is to be understood that the conduits 22C and 22E are connected to a suitable source of fluid under pressure and to a return line, the conduits being valved so as to permit the pressure conditions to be changed from one to the other.

Assuming the conduits to be so connected that conduit 22C is under pressure, the fluid immediately causes the parts to assume the position of Fig. 16, and the piston 28 begins to move toward the right. Fluid will of course flow under the end of the piston 28 and thrust the rod 27A outwardly, being resisted by the fluid above the piston which must escape through openings 26A, groove 25B, and passages 25A and 23 back into the conduit 22C. When the piston 28 reaches the other end of the cylinder, piston 30—the rod piston—continues to move until it sticks the spring ring 31. On the return stroke, when the pressure fluid enters conduit 22E, the valve 24B immediately moves over and closes passage 23 and the reverse operation takes place, the rod 27A having the additional movement as described for the outward stroke.

As stated above, the motors 22 are adapted to move to and from screening position the screen segments 20.

The flap or shutter segments 21 are preferably spring biased toward active position, but need no other positive means for such movement because of the air flow. However, these segments must be positively held in inactive position until needed and this is accomplished by suitable latches 35 fixed in the cowling at the free ends of the shutters. These latches 35 are merely spring actuated members adapted to be withdrawn a short distance to release the shutters. When it is desired to use the shutters, all of the latches are withdrawn simultaneously by the means shown in detail in Figs. 10 to 14.

In these figures, a small piston motor is shown at 36 as having a body provided at one end with two pairs of ears 36A within which are pivoted a pair of oppositely arranged bell cranks or levers 36B, one arm of each of which is pivotally connected to a piston rod 36C. The rod 36C extends into the body and has its inner end formed to provide a piston by forming thereon the flanges 36D, the groove between having therein a suitable O-ring 36E. The end 36E of the rod beyond the adjacent flange 36D is preferably extended a short distance and bored to receive a spring 36F. This piston 36D is slidable within a sleeve 37 fixed in the end of the body and capped as at 37A. A pressure fluid inlet is shown at 38 to admit fluid behind the piston at the inner end of the sleeve 37. The outer ends of levers 36B are connected by means of cables 39 to the latches 35 which may be arranged in pairs as is indicated in Fig. 13, each latch in this figure retaining one of two adjacent shutter segments.

In Fig. 13, a suitable anchor plate 40 is shown as having pivoted thereon a lever 40A to the free end of which is attached the cables 39. At an intermediate portion of the lever are pivoted two links 41, each of which is connected to a latch 35 by means of a swivel 35A so that clockwise movement of the lever will withdraw the latches.

Figure 8:
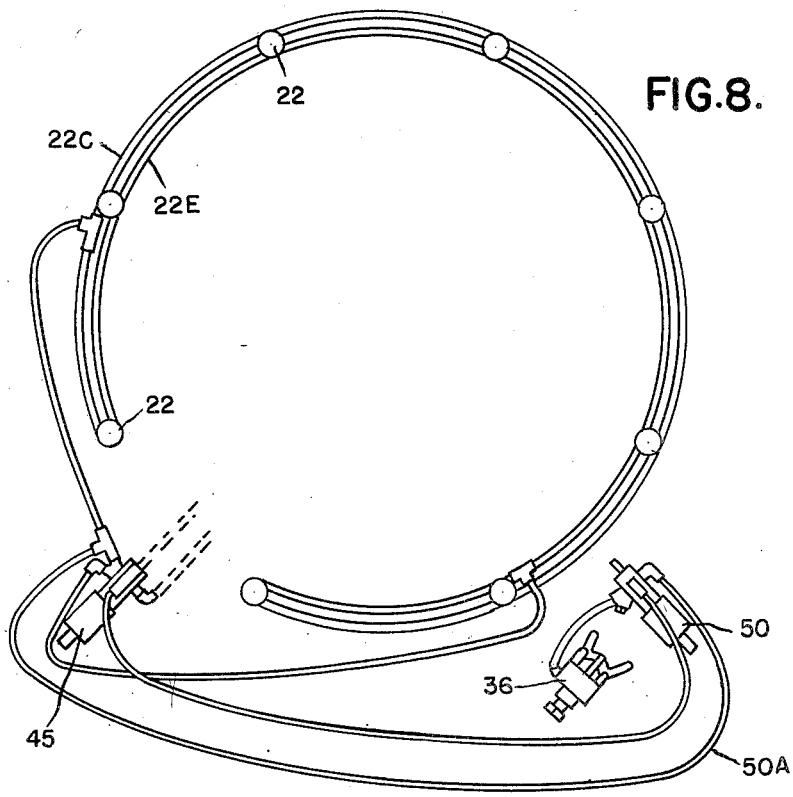
Fig. 8 is a diagrammatic view of the hydraulic means.
Figure 9:
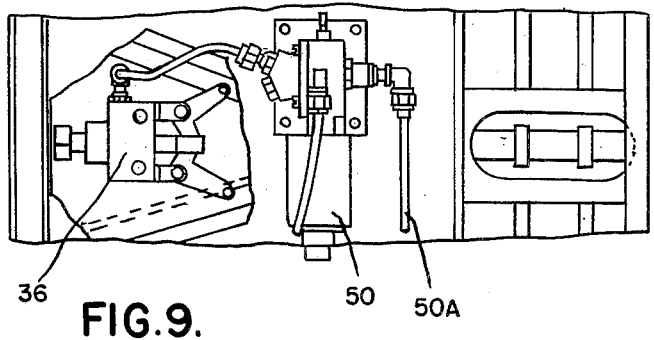
Fig. 9 is a plan view showing the shutter latch operating means.

As indicated in Figs. 1, 6, 8 and 9, the valves controlling the motors 22 and 36 are solenoid operated and numbered respectively 45 and 50, the former controlling the pressure in lines 22C and 22E and the latter controlling the admission of pressure fluid to the motor 36, which pressure fluid is conducted to the motor 36 through the branch conduit 50A leading from the conduit 22C.

It is to be understood that the valve 45 is connected to a suitable source of pressure fluid and to return means for said fluid so that operation of the valve will admit fluid to the desired one of the conduits 22C and 22E and connect the other conduit to the return line in which pressure is low.

In operation, fluid is admitted to the conduit 22E and chamber 22B of the motors 22 to withdraw the screens 30 from operative position and to conduit 22C and under the piston in motor 22 to swing the screens to operative position. During the latter operation, the line 50A leading to valve 50 is also under pressure but the valve 50 is independently controlled so the shutters may remain open. However, if it is desired to close the shutters, the valve 50 is operated when the valve 45 is operated to begin the screen movement so that the shutter travels along with the screen being positively held against the latter by air pressure. The shutter may be biased toward closed position by suitable springs if desired. Further, it is desirable also to provide an interlock between valve 50 and the engine throttle so that the valve is prevented from operating until the throttle is in closed position.

I claim:

1. In jet engine installations for airplanes having an annular air intake and a retractible screen for said intake consisting of segmental portions hinged adjacent the outer periphery of the annulus, a shutter for each of said portions and of substantially the same area, said shutter portions being also hinged adjacent said outer periphery, and arranged in advance of said screen portions, means for actuating said screen portions to move them to and from screening position, means normally maintaining said shutter portions out of the air stream and means actuable only when said screen portions are being moved to screening position for releasing said shutter portions so that they can move with said screen portions and thereby close said air intake.

2. In jet engine installations for airplanes having an annular air intake surrounded by a suitable cowling and a retractible screen for said intake consisting of segmental screen portions hinged adjacent the outer periphery of the annulus, a shutter for each of said portions and of substantially the same area, also hinged adjacent the outer periphery of the annulus and spring biased toward closed position, means normally retaining said shutters in inoperative position against the inner wall of the cowling, hydraulically operated reversible motors for moving the screen portions into and out of screening position, means operable to release said shutters from inoperative position, and means operatively connecting said release means to said motors when the latter are energized to move the screen portions into screening position.

3. In jet engine installations for airplanes having an annular air inlet surrounded by a suitable cowling, a retractible screen for said inlet consisting of segmental screen portions hinged adjacent the surrounding cowling and movable from a position across the annulus to a position substantially parallel with the surrounding cowling, a shutter segment for each of said screen portions, said shutter segments being also hinged adjacent the surrounding cowling and adapted when inactive to lie between the screen portions and the cowling, means for normally retaining the shutter segments in inactive position, hydraulically actuated means for moving said screen portions from their positions parallel with the housing to their positions across the air inlet, and hydraulically actuated means for releasing said shutter segments when said screen portions are so moved.

4. A retractible screen for the annular inlet of jet installations in airplanes consisting of a plurality of hinged screen segments, movable into and out of screening position, a hydraulic reversible motor for each screen segment, a pair of fluid supply lines connected in parallel to all of said motors, valve means for connecting either of said lines to a source of fluid under pressure and simultaneously connecting the other of said lines to a fluid return, a shutter segment for each of said screen segments, said shutter segments being normally retained in inactive position, hydraulic pressure release means for said shutter segments connected to that one of said fluid lines adapted to energize the motors to move the screen segments to screening position, and valve means for controlling said latter connection.

THOMAS N. KELLY.

References Cited in the file of this patent

UNITED STATES PATENTS

| Number | Name | Date |
| --- | --- | --- |
| 2,381,705 | Vokes | Aug. 7, 1945 |
| 2,407,194 | Vokes | Sept. 3, 1946 |
| 2,464,962 | Bent | Mar. 22, 1949 |
| 2,467,305 | Griffin | Apr. 12, 1949 |
| 2,534,138 | Marshall | Dec. 12, 1950 |
| 2,546,153 | De Remer | Mar. 27, 1951 |
| 2,555,592 | Kelly | June 5, 1951 |